Figure 6:
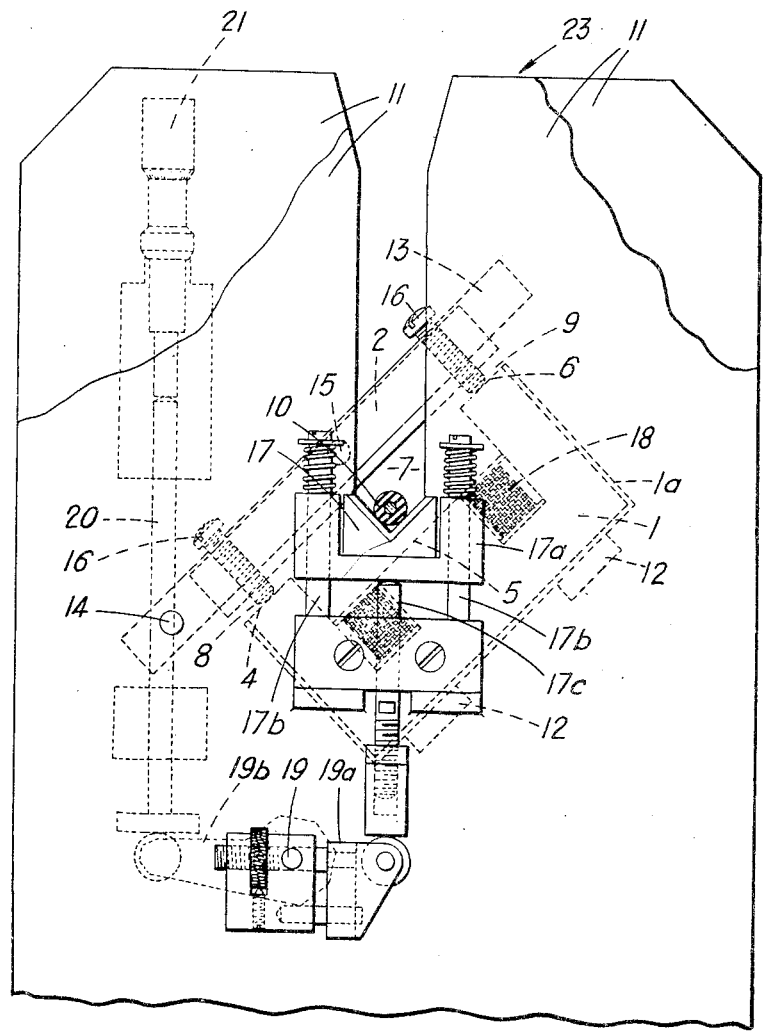

Jan. 29, 1957 J. H. POOLE 2,779,916
MEANS FOR DETECTING ECCENTRICITY
IN INSULATED ELECTRIC CONDUCTORS
Filed Feb. 24, 1955 5 Sheets-Sheet 1
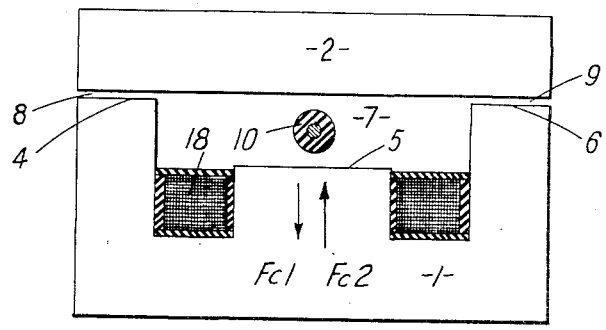
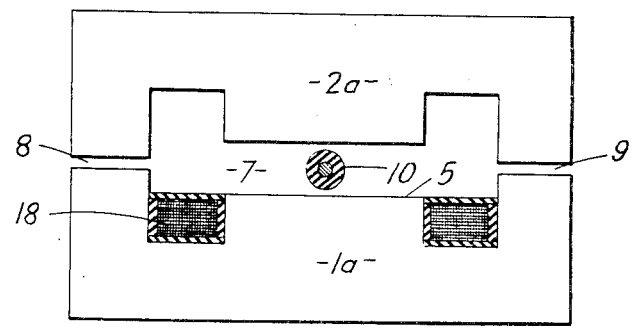
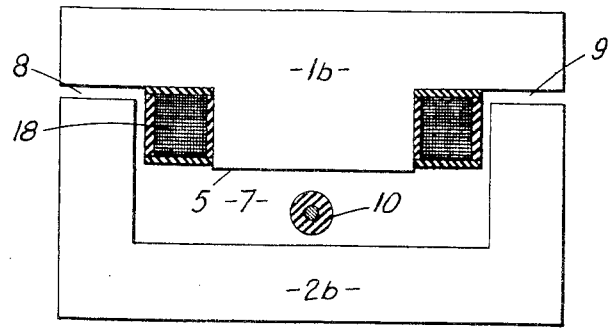
Inventor
John Huyton Poole
By his Attorneys Jan. 29, 1957 J. H. POOLE 2,779,916
MEANS FOR DETECTING ECCENTRICITY
IN INSULATED ELECTRIC CONDUCTORS
Filed Feb. 24, 1955 5 Sheets-Sheet 2
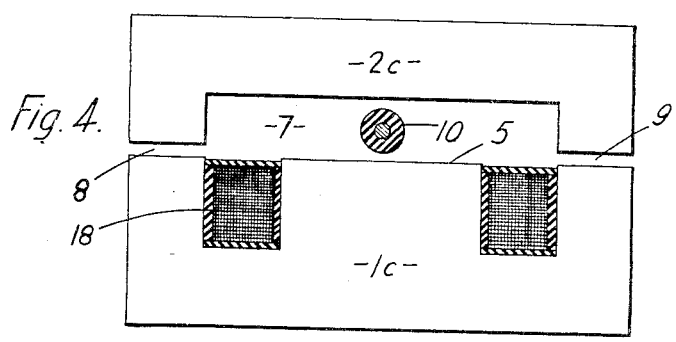
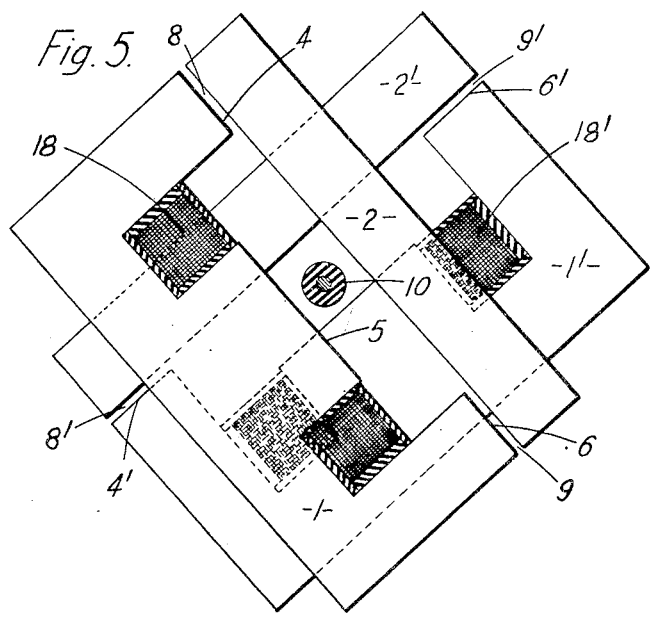
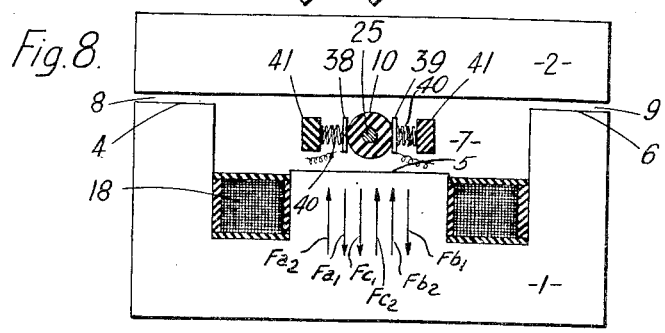
Inventor
John Huyton Poole
By his Attorneys Jan. 29, 1957

J. H. POOLE 2,779,916

MEANS FOR DETECTING ECCENTRICITY
IN INSULATED ELECTRIC CONDUCTORS

Filed Feb. 24, 1955

5 Sheets-Sheet 3

Inventor
John Huyton Poole
By Hooper, Kenard & Buell
his Attorneys

Jan. 29, 1957
J. H. POOLE
2,779,916
MEANS FOR DETECTING ECCENTRICITY
IN INSULATED ELECTRIC CONDUCTORS
Filed Feb. 24, 1955
5 Sheets-Sheet 4
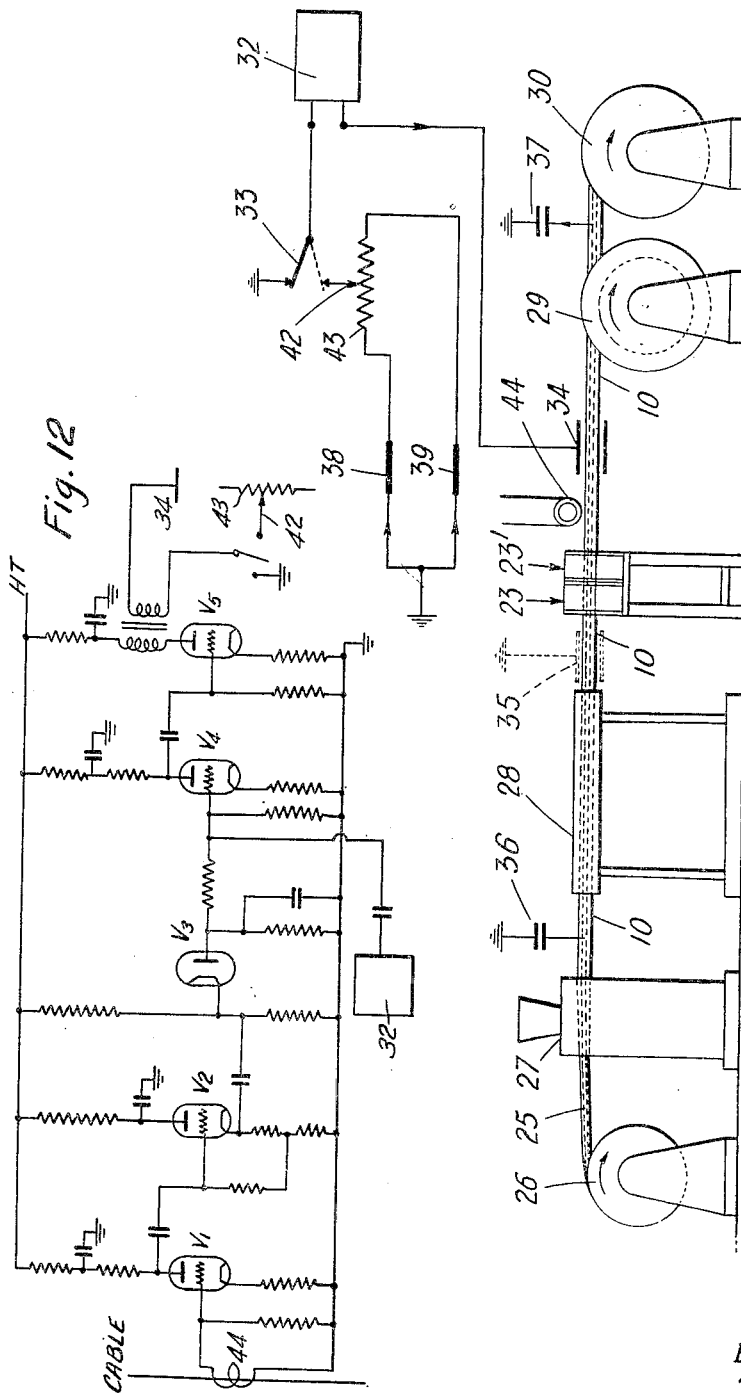
Inventor
John Huyton Poole
By
his Attorneys Jan. 29, 1957   J. H. POOLE   2,779,916
MEANS FOR DETECTING ECCENTRICITY
IN INSULATED ELECTRIC CONDUCTORS
Filed Feb. 24, 1955   5 Sheets-Sheet 5
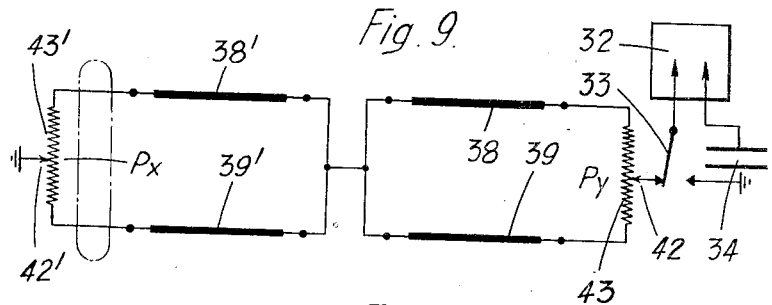
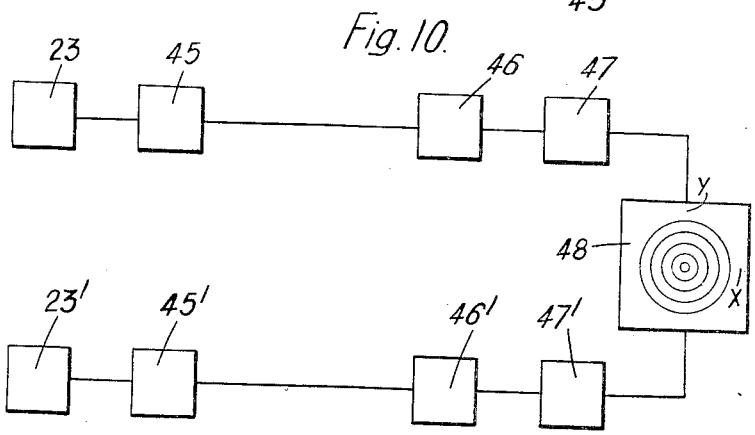
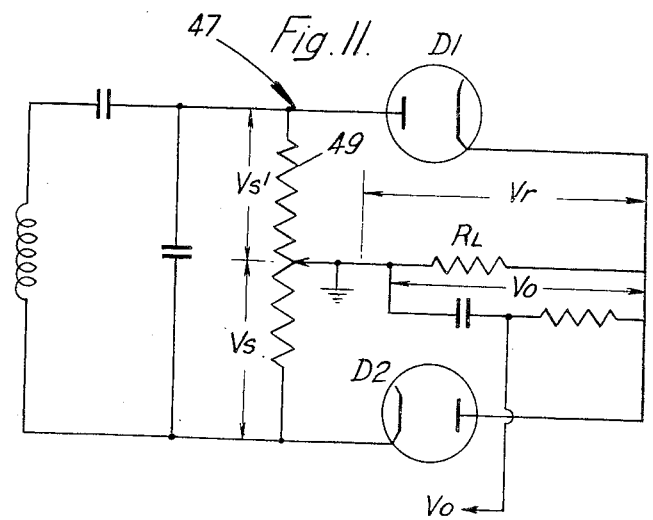
Inventor
John Huyton Poole
By his Attorney United States Patent Office 2,779,916
Patented Jan. 29, 1957

2,779,916

MEANS FOR DETECTING ECCENTRICITY IN INSULATED ELECTRIC CONDUCTORS

John Huyton Poole, St. Helens, England, assignor to British Insulated Callender's Cables Limited, London, England, a British company Application February 24, 1955, Serial No. 490,313

Claims priority, application Great Britain March 2, 1954

16 Claims. (Cl. 324—34)

In the manufacture of insulated electric conductors it is important for technical reasons and if maximum economy in the amount of insulating material is to be obtained that the wall thickness of the covering should conform as closely as possible to the nominal, and, generally, be as uniform as possible around the circumference of the conductor, that is to say that the conductor should be located within its covering in its nominal, usually a central, position within the covering within close limits. To this end methods of detecting and measuring the extent of its departure from its nominal position within its covering, hereinafter for brevity referred to as its eccentricity, have been devised so that, as the insulated conductor is being manufactured, steps can be taken to prevent further production of such faultily insulated wire or cable immediately it is detected. Forms of such eccentricity detecting means are described and claimed in the complete specification of British Letters Patent No. 638,732. The present invention provides improved means for electro-magnetically detecting eccentricity of an insulated electric conductor within its insulating covering.

Our improved eccentricity-detecting means comprises an electro-magnet of which the core comprises three limbs and a pair of yokes. It is made in two relatively movable parts to provide for a variable minor air gap in each outer limb and a major air gap in the central limb. Conductor-guiding means are provided for locating the insulated conductor to be tested for eccentricity in a balance position as it passes through the major gap carrying an alternating current. A pick-up coil is located on the central limb for detecting any resultant flux in the central limb due to eccentricity of the conductor in a direction parallel to or having a component parallel to the pole face or faces at the major gap.

The invention will be more fully described with frequent reference to the accompanying diagrammatic drawings wherein Figure 1 is an end elevation showing a preferred form of electro-magnet, Figures 2, 3 and 4 are end elevations showing examples of other forms of electro-magnet suitable for our improved eccentricity-detecting means, Figure 5 is an end elevation showing a pair of electro-magnets disposed with their respective pole faces at an angle of 90° to one another.

Figure 6 is an end elevation showing an example of a magnet support frame and conductor guide means, Figure 7 is an elevation showing apparatus for applying a covering of insulating material to a core, incorporating means for detecting eccentricity of the core-conductor, Figure 8 is an end elevation of an electro-magnet in the main gap of which are provided reference conductors held in contact with the surface of the conductor under test, Figure 9 is a circuit diagram including the reference conductors of two measuring heads, Figure 10 is a block diagram of the preferred form of the complete eccentricity measuring equipment and Figure 11 is a circuit diagram of a phase-sensitive detector for use in the pick-up coil measuring circuit.

Figure 12 is a circuit diagram of an automatic gain control device for controlling the output of an oscillator in accordance with test current flowing in the conductor under test.

The preferred shape of magnet core is shown in Figure 1. It comprises a part 1 of E-shape and a part 2 of I-shape which bridges the three pole faces 4, 5 and 6 of the E-shaped part to leave a central major gap 7 and two minor gaps 8 and 9 which are variable in length by adjustment of one or both parts in the frame in which they are mounted.

Other forms of magnet core may be used and some examples are shown in Figures 2, 3 and 4. The core shown in Figure 2 consists of two E-shaped parts 1a and 2a placed face to face, that shown in Figure 3 comprising a C-shaped part 2b and a F-shaped part 1b on the limb of which the coil is mounted. In the example shown in Figure 4, the coil is mounted on the central limb of an E-shaped part 1c and the other part 2c is of C-shape. The essential requirement is that the core shall provide for a magnetic field set up by a conductor positioned in the major gap and carrying alternating current, a pair of paths which, by adjustment of the length of one minor gap relative to that of the other minor gap, can be made to have the same reluctance or reluctances which differ to a small but regulatable extent.

Alternating current flowing along an insulated conductor located in the major gap of the magnet core will induce an alternating magnetic field which results in two components of flux in the central limb of the magnet. In Figure 1, these components, which will be opposite in direction, are designated by arrows $F_{c1}$ and $F_{c2}$. They will link the pick-up coil 18 on the central limb. For each given setting of the two minor gaps 8 and 9 there is a unique position for an insulated conductor 10 contained in a plane parallel to the pole face 5 of the central limb, at which the sum of the two fluxes $F_{c1}$ and $F_{c2}$ is zero, although due to manufacturing tolerances this position, hereinafter referred to as the balance position, is not necessarily on the geometrical centre line of the magnet. Accordingly if when the insulated conductor is held by guiding means in such balance position any deviation of the wire from its nominal position in the insulated conductor in a direction parallel to or having a component parallel to the adjacent pole face will result in unbalance between the two components of flux in the central limb and in a voltage proportional to the deviation being induced in the pick-up coil. The magnitude of the induced voltage is therefore a measure of the eccentricity of the conductor in a plane parallel to the pole face on the central limb.

Since the direction of eccentricity may seldom be parallel to the pole face of the central limb of the magnet and may sometimes be normal to that pole face and hence without effect on the two components of flux in the central limb, it is preferred to pass the insulated conductor through the major gap of a similar electromagnet disposed with its pole face at 90° to that of the first magnet, to obtain a measure of the eccentricity of the wire in a direction at right angles to that measured by the first system. An example of an arrangement employing two measuring heads is illustrated by Figure 5 which shows a pair of magnets having cores of the same shape as that of the magnet shown in Figure 1, the parts of the one magnet having been given the same reference numerals as in Figure 1 and the corresponding parts of the other magnet having been given the same reference numerals distinguished by a dash. The voltages induced in the coils of the two magnets may be summated to provide an indication of the magnitude of the eccentricity. It will be understood that with a twin measuring head arrangement such as shown in Figure 5 the guide means for the cable must provide for adjustment of the cable in a direction having a component parallel to the pole face of the major gap of one magnet and for adjustment in a direction having a component parallel to the corresponding pole face of the other magnet.

It is preferred to support each of the electromagnets in a frame comprising a pair of parallel end plates 11 each with a central slot for passage of the insulated conductor 10 under test and to rigidly mount the E-shaped part 1 and its copper shroud 1a on bars 12 extending between the end plates 11 and so positioned that the pole face 5 of the central limb lies at an angle of 45° to the vertical. The I-shaped part 2 is mounted in a rectangular frame 13 pivotally connected at one end to the end plates so as to turn on pivots 14 about a horizontal axis parallel to the axis of the instrument. The part 2 is supported in the frame 13 by pivots 15 so as to turn about its central horizontal axis. Fine adjustment of the ends of the I-shaped part 2 to and from the pole faces 4 and 6 of the E-shaped part 1 to vary the length of the one minor gap relative to that of the other minor gap is obtained by two pairs of screws 16, one pair working in the lower end of the I-piece and bearing on pole face 4 and the other in the upper end of the I-piece and bearing on pole face 6.

As guiding means for holding the advancing conductor 10 in the balance position any appropriate arrangement of guides may be used. A preferred arrangement is that shown in Figure 6. It comprises a pair of V-channelled blocks 17, one on the inlet and one on the outlet side of the measuring head. Each is held in a carrier 17a slidable vertically on guides 17b and spring loaded in a downward direction. Each carrier 17a is supported by a push rod 17c of adjustable length of which the lower end is supported by one of a pair of cranks 19a, mounted one at each end of a crank shaft 19 which carries a third crank 19b at 180° to the first two cranks. This third crank is adjustably positioned by a push rod 20 whose vertical position is set by a micrometer screw head 21. The third crank and its positioning means are preferably located between the frame supporting one magnet and a second frame supporting a second magnet similarly but positioned at 90° to the first magnet as shown in Figure 5.

It will be appreciated that for a given setting of the V-guides 17 for the insulated conductor, a change in overall diameter of the insulated conductor will take the conductor out of the balance position. Accordingly the height of the V-guide must be adjusted to suit the diameter of the cable under test. This is facilitated by the use of V-guides having side walls set at 90° as shown and making the ratio of the throw of the crank 19b to that of the cranks 19a equal to $\sqrt{2}$, in order that the micrometer 21 may be read directly in terms of cable diameter.

The electro-magnets of our improved eccentricity-detecting means may be located at any suitable point in the travel of the insulated conductor to be tested. For example as shown in Figure 7 of the drawings, the two measuring heads 23 and 23' used to measure eccentricity in the wall thickness of a covering of thermo-plastic material applied to a bare or insulated conductor 25 drawn off a supply reel 26 by an extruder 27 may be located between the cooling trough 28 and the haul-off capstan 29 from which the covered core 10 passes on to a take-up reel 30.

Alternating current of appropriate frequency for instance, 40 kilo-cycles/second may be fed from an oscillator 32 to the insulated conductor 10 under test by means of an electrode through or over which the insulated conductor passes. This may be located adjacent to the electro-magnets—either in front or to the rear, but preferably on the output side and may comprise a metal trough of V-section having a V-angle of 90° or it may comprise a mass of hanging ball chain. The circuit is shown in Figure 7 where the oscillator has one terminal connected to earth through switch 33 (the purpose of which will be hereinafter explained) and the other capacitively coupled to the insulated conductor 10 by an electrode 34. The return may be obtained by the stray capacitance couplings, diagrammatically shown at 36, 37, between the conductor and earth or by directly earthing one end of the conductor 10 or by both as may be most convenient.

The electro-magnets are balanced by placing a short length of insulated conductor having zero eccentricity in the V-guides or other form of conductor guiding means and adjusting the minor gaps 8 and 9 in the outer limbs of the magnets to give zero resultant voltage in the pick-up coils 18 on the central limbs. When this condition is attained the conductor is then in the balance position with respect to both magnets.

It is not always possible to locate the insulated conductor in the balance position, that is in the position in which, if there is no eccentricity, the components of flux in the central limb will balance and the resulting E. M. F. induced in the pick-up coil will be zero. This is especially so in the case of the finer sizes of insulated conductors, including enamelled wires having a wall thickness of insulation of only about 0.002 inch and eccentricities of the order of 0.0003 inch. We have found however, that under certain conditions the effect of lateral movement of the insulated conductor on the accuracy of eccentricity measurement by the apparatus described may be reduced by the use of reference conductors in the main gap and in accordance with a further feature of our invention we provide two such conductors disposed on diametrically opposite sides of the insulated conductor under test and removably held in contact with the surface thereof. They are similar to each other in form and when in position are similarly spaced from the pole face of the central limb of the magnet and when operative are fed with alternating currents of such value that at any instant the sum of the currents flowing in the reference conductors is equal in magnitude and opposite in direction to that flowing in the part of the insulated conductor under test. This arrangement is shown diagrammatically in Figure 8 of the drawings, where the two reference conductors designated 38, 39 are supported by and resiliently urged into contact with the surface of the insulated conductor 10 by springs 40 on insulating supports 41. Each reference conductor either alone or in conjunction with its support is readily removable from its operative position into a position in which it is clear of the travelling conductor. When the wire conductor 25 of the insulated conductor is centrally placed within its covering, the currents flowing in the conductor under test and in the two reference conductors will then result in six components of flux in the central limb which summate to zero. These components are shown by the vectors $F_{a2}$, $F_{a1}$, $F_{c1}$, $F_{c2}$, $F_{b2}$ and $F_{b1}$ in Figure 8. This holds over a range of movement of the three-conductor system within which the coupling between the pick-up coil 18 and the loop formed by each reference conductor and the insulated conductor remains constant. This range is governed by the width of the pole face 5 of the central limb which is made appreciably greater than the maximum diameter of insulated conductor to be tested. Movement of the conductor 25 of insulated conductor or cable 10 relative to the reference conductors 38, 39 in a plane parallel to the pole face 5 will however result in an unbalance of which the magnitude is proportional to the eccentricity in that plane. Variation in diameter of the insulated conductor will have no effect upon the pick-up coil.

The required distribution of current flow in the insulated conductor and the two reference conductors may be obtained by capacitively coupling the insulated conductor under test to one output terminal of an oscillator generator as previously described with reference to Figure 7 and instead of coupling the other output terminal of the oscillator to earth through the two-position switch 33, coupling it through this switch to the slide contact 42 of a potentiometer 43 whose ends are connected one to one end of one reference conductor, say 38, and the other to the corresponding end of the other reference conductor 39, and connecting the other ends of the two reference conductors to the tail end of the conductor 25 of the insulated conductor or cable 10 under test, preferably through earth. The reference circuits are then balanced by the use of lengths of standard insulated conductors of maximum and minimum diameter and having no eccentricity, the setting of the potentiometer 43 being adjusted until the value of the voltage induced in the pick-up coil 18 becomes zero.

Where, as will generally be the case, two similar heads, 23 and 23', are used in order to detect eccentricity in any direction, the other ends of the two reference conductros 38 and 39 of the first head may be connected together and to the adjoining ends of the two reference conductors 38' and 39' respectively of the second head, the other ends of these two reference conductors 38' and 39' being connected respectively to the two ends of a second potentiometer 43' of which the slide contact 42' is connected to earth, as shown in Figure 9 of the drawings. In such case the reference circuits of the two heads are balanced by adjusting their respective potentiometers.

The advantage of using reference conductors varies with the lay-out of the machine or plant on which the insulated conductor is being manufactured and with the type of insulated conductor produced. In some cases conditions may be such that these reference conductors should be thrown out of action and the apparatus be used with the insulated conductor running through the major gaps of the magnets in the balance postion. The reason for this is as follows: When testing insulated conductors having a direct conductive path from test point to earth the effect of stray capacity, in Figure 7 represented by capacitor 37, between the part of the conductor on the output side of the test head and earth is negligible. When there is no such direct conductive path, as may be the case where testing for conductor eccentricity after applying a second or third covering of insulation to the conductor, it may be necessary to rely on the stray capacity, represented by capacitor 36, between the part of the conductor on the input side of the test head (or heads) and earth to obtain a return path for the current flowing from the conductor under test through the reference conductors back to the oscillator. The resulting flux in the central limb due to the current in the insulated conductor and the return currents in the reference conductors is, as has been indicated, independent of lateral movement of the three-conductor system over the range of uniform coupling. The current due to the stray capacity between the insulated conductor on the output side of the test head (or heads) and earth may be comparable in magnitude to that due to stray capacity between the insulated conductor on the input side and earth. The former will also divide and return through the reference conductors but the resultant flux will be zero only providing the electro-magnet is correctly balanced and the three-conductor system is symmetrically located about the balance position. Lateral movement of the system or an asymmetrical location of the reference conductors relative to balance position will result in an E. M. F. being induced in the pick-up coil of which the magnitude depends upon the value of the stray capacitance current derived from the stray capacitance on the output side and upon the degree of movement of the system. Hence the greater value of such stray current the smaller the permissible lateral movement. When or just before the stray capacity on the output side becomes equal to that on the input side of the test head, the reference conductors should be removed from contact with the insulated conductor under test and the second output terminal of the oscillator earthed directly instead of through the reference conductors, as by changing over switch 33 in Figure 7.

It will be seen that our improved eccentricity detecting means, if provided with reference conductors capable of being put into or out of operation, is capable of being used for the accurate determination of eccentricity in a wide range of insulated conductors. It can successfully be employed for insulated conductors varying from fine enamelled wires to insulated wires of $5/8$ inch diameter or higher having a covering of rubber or plastic or other insulation applied in one or more layers.

It has been explained that in some cases the test current flowing along the insulated conductor is dependent upon the ratio of the stray capacity between the part of the conductor on the input side of the measuring head and earth and the stray capacity between the part of the conductor on the output side of the measuring head and earth. This ratio will vary with the transfer of conductor from input to output side of the head. In order to compensate for this variation and to correct for the change in coupling between the electrode 34 and the insulated conductor under test as the latter varies in diameter from job to job, and so maintain the sensitivity of the measuring device reasonably constant, for instance to within $\pm 10\%$, we may use an automatic gain control system to control the output of the oscillator in accordance with the test current flowing in the conductor under test. This is illustrated in Figure 12 of the drawings and comprises a small pick-up coil 44 (shown also in Figure 7) located near the insulated conductor at the measuring head. The voltage induced in this coil by the test current is amplified by valve $V_1$, rectified by valve $V_2$ and then applied to the grid of a variable mu valve $V_4$ in the oscillator circuit which adjusts the output of the oscillator 32 in a direction to maintain the test current in the insulated conductor constant.

It has been indicated that the summated voltages of the two pick-up coils of the two electro-magnets provide an indication of the magnitude of the eccentricity of the insulated conductor. To obtain an indication of both of magnitude of the eccentricity detected and its direction, we prefer to apply the voltages to a cathode-ray oscilloscope. To this end, as shown in the schematic diagram designated Figure 10, we apply the pick-up voltage from each coil of the two measuring heads 23, 23' set at 90° to one another to a cathode follower 45 or 45' mounted in the base of each head. After passing through these followers the two voltages are amplified by amplifiers 46 and 46' of any suitable known type and then applied to phase sensitive detectors 47 and 47'. Figure 11 shows an example of a suitable phase sensitive detector. It comprises a balanced diode circuit to which is fed the amplified signal from the coil of one of the measuring heads to set up a voltage across a potential divider 49 connected to the anode of the diode $D_1$ and the cathode of diode $D_2$. The sliding contact of the potential divider is earthed and coupled through a load resistance $R_L$ to the cathode of diode $D_1$ and anode of diode $D_2$ across which resistance the reference voltage $V_r$ is applied. Assuming that the direction of eccentricity is such that the part $V_s'$ of the measuring coil voltage applied to diode $D_1$ is in phase with the reference voltage $V_r$, then the other part $V_s$ applied to diode $D_2$ is 180° out of phase with $V_r$ and the voltage across the load resistance will be that due to current flowing in the circuit containing diode $D_1$ and the output voltage $V_o$ will be positive. If the direction of eccentricity reverses, the diode $D_2$ will control the current through $R_L$, which will be in the reverse direction, and the direct output voltage $V_o$ will be negative. The output $V_o$ of one detector 47 is applied to the X plates of an oscilloscope 48 and that $V_o'$ from the other detector 47' to the Y plates of the oscilloscope. The screen of the oscilloscope is calibrated radially, a linear scale being obtained. The sensitivity of measurement is controlled in a conventional manner by potentiometers in the amplifier circuits. Preferably the reference voltage $V_r$ of the phase sensitive detectors 47 and 47' is derived from the voltage induced in the small pick-up coil 44 controlling the oscillator. In this way the phase relationship between the eccentricity and the reference voltages is independent of the cable circuit.

What I claim as my invention is:

1. Apparatus for electro-magnetically detecting eccentricity in any radial direction of an insulated electric conductor within its insulating covering, comprising a pair of electro-magnets each having a core comprising a central and two outer limbs and a pair of yokes, said core being in two parts separated by a variable minor magnetic gap in each outer limb and a major air gap in the central limb, means for positioning said magnets with a pole face of the major gap of one magnet core at 90° to the corresponding pole face of the major gap of the other magnet core, conductor guiding means for locating a longitudinally advancing insulated conductor to be tested for eccentricity in a balance position in each major gap as it passes successively through the two major gaps carrying alternating current, and means including a pick-up coil on the central limb of each magnet for detecting any resultant flux in the limb carrying it due to eccentricity in a direction having at least a component parallel to a pole face of that limb.

2. Apparatus as specified in claim 1, having means for effecting a fine adjustment of said conductor guiding means in a direction having components parallel to the pole faces of the major gaps in both magnet cores.

3. Apparatus for electro-magnetically detecting eccentricity in a given direction of an insulated electric conductor within its insulating covering, comprising an electro-magnet having a core comprising a central and two outer limbs and a pair of yokes, said core being in two relatively movable parts to provide for a variable minor magnetic gap in each outer limb and a major air gap in the central limb, means for guiding an insulated conductor to be tested for eccentricity through said major gap, a pair of reference conductors of similar form disposed in said major gap on diametrically opposite sides of the part of the insulated conductor in that major gap, means for removably holding said reference conductors in contact with the surface of said insulated conductor and similarly spaced from the pole face at said major gap, means for feeding alternating current to the said insulated conductor and to said reference conductors so that at any instant the sum of the currents flowing in said reference conductors is equal in magnitude and opposite in direction to that flowing in the part of the insulated conductor under test, and means including a pick-up coil on the central limb of said magnet for detecting any resultant flux in said central limb due to eccentricity of the insulated conductor in its insulating covering in a direction having at least a component parallel to a pole face at the said major gap.

4. Apparatus as specified in claim 3, wherein said means for feeding alternating current to said insulated conductor and said reference conductors comprises an oscillator, means for capacitively coupling one output terminal of said oscillator to said insulated conductor under test, a potentiometer having a slide contact, means for coupling the other output terminal of said oscillator to said slide contact, means for connecting one end of said potentiometer to one of said reference conductors and the other end of said potentiometer to the corresponding end of the other reference conductor and means for connecting the other ends of said reference conductors to the tail end of said longitudinally advancing insulated conductor, preferably through earth.

5. Apparatus as specified in claim 4, wherein the means coupling the slide contact of the potentiometer to one output terminal of the oscillator comprises a two-position switch which in its other operative position isolates the reference conductors from the said output terminal of the oscillator and connects that output terminal to ground.

6. Apparatus for electro-magnetically detecting eccentricity in any radial direction of an insulated electric conductor within its insulating covering, comprising a pair of electro-magnets each having a core comprising a central and two outer limbs and a pair of yokes, said core being in two parts separated by a variable minor magnetic gap in each outer limb and a major air gap in the central limb, means for positioning said magnets with a pole face of the major gap of one magnet core at 90° to the corresponding pole face of the major gap of the other magnet core, means for guiding an insulated conductor to be tested for eccentricity through the major gaps of both magnets, a pair of reference conductors of similar form disposed in each major gap on diametrically opposite sides of the part of the insulated conductor in that major gap, means for removably holding said reference conductors in contact with the surface of said insulated conductor and similarly spaced from the pole face of the central limb defining the air gap in which they lie, means for feeding alternating current to the insulated conductor and to the two pairs of reference conductors so that at any instance the sum of the currents flowing in the reference conductors of a pair is equal in magnitude and opposite in direction to that flowing in the part of the insulated conductor lying directly between them, and means including a pick-up coil on the central limb of each magnet core for detecting any resultant flux in that limb due to eccentricity of the insulated conductor in its insulating covering in a direction having at least a component parallel to the pole face of the central limb on which the pick-up coil is carried.

7. Apparatus as specified in claim 6, wherein said means for feeding alternating current to said insulated conductor and said two pairs of reference conductors comprises an oscillator, means for capacitively coupling one output terminal of said oscillator to said insulated conductor under test, a potentiometer having a slide contact, means coupling the other output terminal of said oscillator to said slide contact, means for connecting one end of said potentiometer to one reference conductor of one pair of reference conductors and the other end of said potentiometer to the other reference conductor of the same pair, means connecting the other ends of the reference conductor of that pair to the respective neighbouring ends of the reference conductors of the second pair of reference conductors, a second potentiometer having a slide contact connected to ground, and means connecting the other ends of the reference conductors of the second pair respectively to the two ends of the second potentiometer.

8. Apparatus as specified in claim 7, wherein the means coupling the slide contact of the first potentiometer to one output terminal of the oscillator comprises a two-position switch which in its other operative position isolates the reference conductors from the said output terminal and connects said terminal to ground.

9. Apparatus for electro-magnetically detecting eccentricity in any radial direction of an insulated electric conductor within its insulating covering, comprising a pair of electro-magnets each having a core comprising a central and two outer limbs and a pair of yokes, said core being in two parts separated by a variable minor magnetic gap in each outer limb and a major air gap in the central limb, means for positioning said magnets with a pole face of the major gap of one magnet core at 90° to the corresponding pole face of the major gap of the other magnet core, conductor guiding means for locating a longitudinally advancing insulated conductor to be tested for eccentricity in a balance position in each major gap as it passes successively through the two major gaps carrying alternating current, a pick-up coil on the central limb of each magnet core for detecting any resultant flux in the limb carrying it due to eccentricity of the insulated conductor in a direction having at least a component parallel to a pole face of that limb, and means for summating the voltages induced in the two pick-up coils to provide an indication of the magnitude of the eccentricity.

10. Apparatus for electro-magnetically detecting eccentricity in any radial direction of an insulated electric conductor within its insulating covering, comprising a pair of electro-magnets each having a core comprising a central and two outer limbs and a pair of yokes, said core being in two parts separated by a variable minor magnetic gap in each outer limb and a major air gap in the central limb, means for positioning said magnets with a pole face of the major gap of one magnet core at 90° to the corresponding pole face of the major gap of the other magnet core, conductor guiding means for locating a longitudinally advancing insulated conductor to be tested for eccentricity in a balance position in each major gap as it passes successively through the two major gaps carrying alternating current, a pick-up coil on the central limb of each magnet core for detecting any resultant flux in the limb carrying it due to the eccentricity of the insulated conductor in a direction having at least a component parallel to a pole face of that limb, a cathode ray oscilloscope, means including an amplifier and a phase-sensitive detector for passing the voltage induced in one pick-up coil to the X plates of said oscilloscope and means including a second amplifier and a second phase-sensitive detector for passing the voltage induced in the other pick-up coil to the Y plates of said oscilloscope.

11. Apparatus as specified in claim 10, wherein each phase-sensitive detector comprises a balanced diode circuit comprising a pair of diodes, a potential divider connected to the anode of one diode and the cathode of the second and across which the amplified signal from the pick-up coil from one electro-magnet is applied, said divider having a grounded slide contact coupled through a load resistance to the junction between the cathode of the first diode and the anode of the second, across which load resistance a reference voltage is applied, whereby the direct voltage at said junction, which is applied to the oscilloscope, is positive or negative depending on the direction of eccentricity of the insulated conductor.

12. Apparatus as specified in claim 11, wherein the reference voltage of the phase-sensitive detectors is derived from a pick-up coil, which is located near the insulated conductor and said electro-magnets and in which a voltage is induced by the test current flowing in the insulated conductor.

13. Apparatus for electro-magnetically detecting eccentricity in a given direction of an insulated electric conductor within its insulating covering, comprising an electro-magnet having a core comprising a central and two outer limbs and a pair of yokes, said core being in two relatively movable parts to provide for a variable minor magnetic gap in each outer limb and a major air gap in the central limb, conductor guiding means for locating a longitudinally advancing insulated conductor to be tested for eccentricity in a balance position as it passes through the major gap, an electrode along which the insulated conductor passes located on the output side of said electro-magnet and means for feeding alternating current to said electrode, and means including a pick-up coil on said central limb for detecting any resultant flux in said central limb due to eccentricity of the conductor in a direction having at least a component parallel to a pole face at said major gap.

14. Apparatus for electro-magnetically detecting eccentricity in a given direction of an insulated electric conductor within its insulating covering, comprising at least one electro-magnet having a core comprising a central and two outer limbs and a pair of yokes, said core being in two relatively movable parts to provide for a variable minor magnetic gap in each outer limb and a major air gap in the central limb, conductor guiding means for locating a longitudinally advancing insulated conductor to be tested for eccentricity in a balance position as it passes through the major gap, an oscillator for feeding an alternating test current to the insulated conductor under test for eccentricity, a pick-up coil located near the insulated conductor and the electro-magnet, a variable mu valve in the oscillator circuit, means for amplifying and rectifying the voltage induced in the pick-up coil by the test current flowing in the insulated conductor, and then applying it to the grid of said variable mu valve, whereby to adjust the output of said oscillator in a direction to maintain the test current in the part of the insulated conductor passing through the electro-magnet substantially constant during the gradual transfer of the conductor from a pay-out reel to a take-up reel and as the diameter of the conductor varies from job to job.

15. Apparatus for electro-magnetically detecting eccentricity in at least one given direction of an insulated electric conductor within its insulating covering of nominally circular cross-section, comprising at least one measuring head comprising an electro-magnet of which the core comprises a central limb and two outer limbs and a pair of yokes and is made in two relatively movable parts to provide for a variable minor magnetic gap in each outer limb and a major air gap in the central limb which has a pole face lying at an acute angle to the vertical, conductor guiding means for locating the insulated conductor to be tested for eccentricity in a balance position as it passes through said major gap carrying alternating current, said guiding means comprising a pair of V-channelled blocks, one on the inlet and one on the outlet side of said measuring head, slidable vertically on guides and micrometer means for simultaneously adjusting the vertical positions of both V-channelled blocks.

16. Apparatus as specified in claim 15, wherein the the side walls of the V-channels are at 90° to one another and the blocks are supported by a pair of cranks on a horizontal crank shaft whose angular position is controlled by movement of a vertically slidable member pressing upon a third crank lying at 180° to the first said cranks and having a throw of $\sqrt{2}$ times the throw of the first cranks, movement of said vertically slidable member being controlled and measured by a micrometer.

References Cited in the file of this patent

UNITED STATES PATENTS

| | | |
|---|---|---|
| 2,361,738 | Bird | Oct. 21, 1944 |
| 2,558,485 | Gow | June 26, 1951 |